United States Patent Office 3,048,243
Patented Aug. 7, 1962

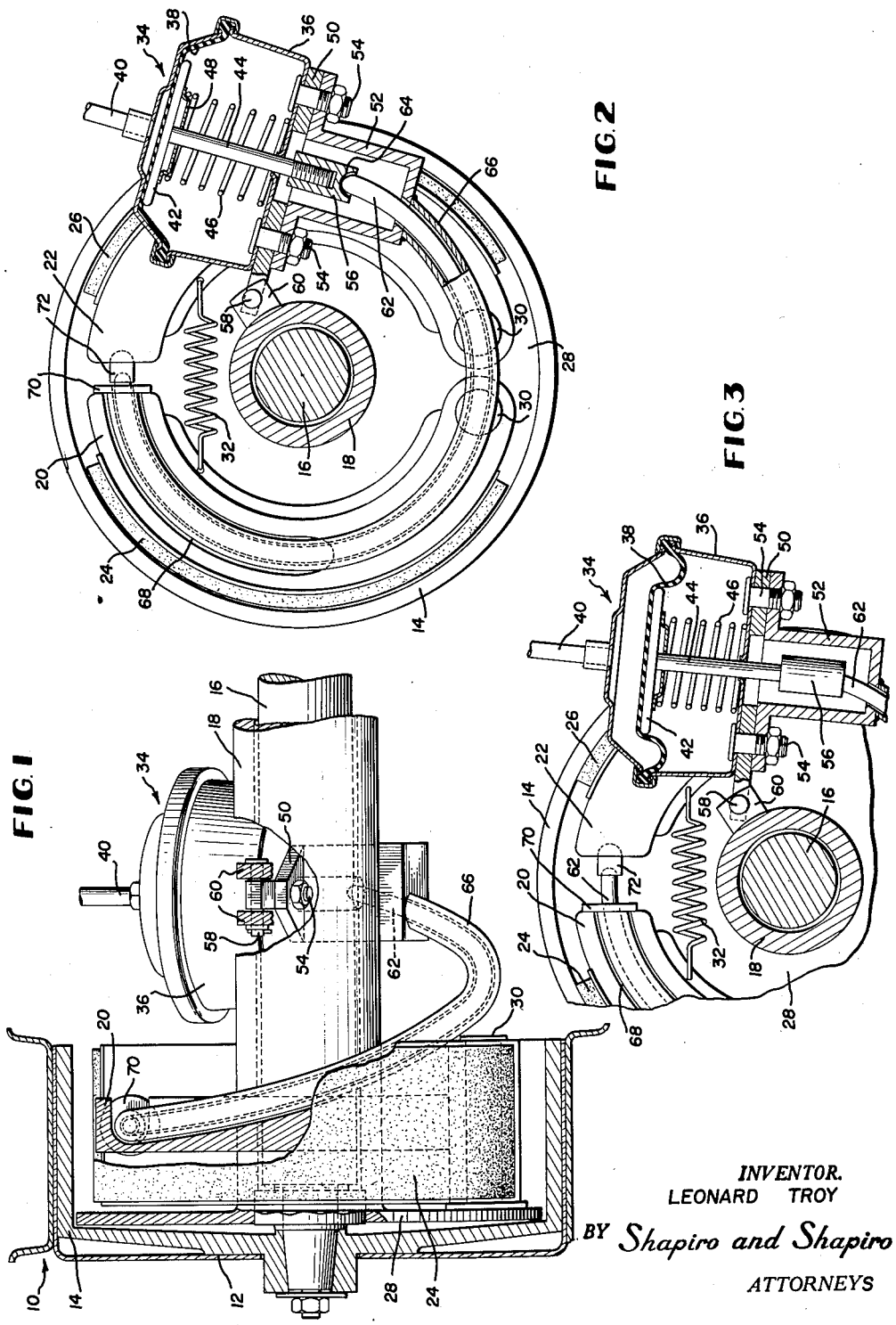

3,048,243
BRAKE ACTUATOR MECHANISM
Leonard Troy, Corner Glenn and Meylert, Scranton, Pa.
Filed Feb. 8, 1960, Ser. No. 7,267
16 Claims. (Cl. 188—78)

This invention relates to a brake actuator mechanism, and more particularly to a mechanism for moving a pair of internal brake shoes with respect to their drum.

The present invention is especially concerned with brake actuators employing fluid motors, such as hydraulic or pneumatic cylinders. The fluid actuators employed heretofore can be generally divided into those which place the fluid motors within the brake drum and those which place the motors outside of the drum. The former type have an advantage in that the actuating force may be applied substantially at the situs of the brake shoes. However, the size of the actuators is limited by the available space within the drum, and the cylinder mounting arrangements and connections to the shoes are often much more complex than would be expected from initial consideration of this type of actuator. Moreover, when the actuators are driven hydraulically, vaporization of the fluid due to heat generated in the brakes and leakage of the fluid upon the brake lining are serious problems.

External mounting of the actuator permits a substantial increase in the size of the fluid motor and eliminates any leakage problem within the drum but requires some form of extensive linkage to connect the motor to the shoes. Such a linkage must be suitably protected from adverse road elements and often is complex and relatively inefficient.

It is accordingly a principal object of the invention to provide an improved mechanism for actuating brakes or the like.

A further object of the invention is to provide a brake actuating mechanism which permits the mounting of the actuator motor externally of the drum and yet does not require a complex linkage to connect the motor and brake shoes.

An additional object of the invention is to provide a device of the foregoing type in which the connections between the actuator motor and the brake shoes require no special protection from the elements.

Still another object of the invention is to provide a mechanism of the foregoing type which eliminates the need for inefficient and expensive devices such as slack adjusters, cam shafts, and rollers.

Briefly stated, the invention resides in an actuator which in a specific form comprises a coaxial tube and rod of constant curvature, which are connected at their opposite ends to an actuator motor and to a pair of brake shoes. The arrangement is such that the shoes are actuated by an action-reaction phenomenon.

The foregoing and other objects, advantages, and features of the invention, and the manner in which the same are accomplished will become more readily apparent upon consideration of the following detailed description of the invention taken in conjunction with the accompanying drawings, which illustrate a preferred and exemplary embodiment of the invention, and wherein:

FIGURE 1 is a partly sectional side elevation view of the mechanism of the invention;

FIGURE 2 is a partly sectional elevation view taken 90 degrees from the view of FIGURE 1; and FIGURE 3 is a truncated view similar to FIGURE 2, illustrating the manner of operation of the invention.

Referring to the drawings, the mechanism of the invention is shown in association with a wheel brake portion of a vehicle. The wheel 10 has a hub 12 to which a brake drum 14 is fixed in any suitable manner. The details of the wheel are unimportant to the invention and are shown somewhat diagrammatically, the wheel being rotatably mounted on an axle 16, which has an axle housing 18.

In addition to the drum 14 the brake comprises a pair of internal brake shoes 20 and 22, which are substantially concentric with the drum and which support brake linings 24 and 26 at their outer surfaces. One end of each shoe is pivotally mounted on a fixed backing plate 28 by an anchor pin 30. The brake shoes are held retracted from the brake drum in any suitable manner, as by a return spring 32 connected to the respective shoes adjacent their free ends.

The brake actuator mechanism of the invention comprises a fluid pressure chamber 34, which in the form shown is a casing or cylinder 36 containing a diaphragm 38. The construction of the chamber per se is conventional, the periphery of the diaphragm being secured and sealed to the side wall of the casing intermediate the casing ends. The space above the diaphragm is connected to a source of air pressure (not shown) by a pipe 40. Below the diaphragm is a piston or plunger 42 having a rod 44 which passes through the bottom of the casing. The rod is surrounded by a diaphragm return spring 46 which engages the bottom of the casing and a collar 48 below the piston.

The casing 36 is joined to a mounting plate 50 and a depending housing 52, as by bolts 54. The lower end of the rod 44 is threaded into an adjusting link 56. The mounting plate 50 is pivoted at 58 on a bracket 60 fixed to the axle housing 18. Thus the casing 36 is floatingly mounted.

Housing 52 has an opening at its bottom through which extends the end of a rod 62. The end of the rod is smoothly rounded and fits within a smoothly rounded seat 64 on the adjusting link 56. Rod 62 is coaxial with an outer tube 66, which is fixed to and extends from the bottom of the housing 52. The rod and the tube have the same constant curvature, and may be circular or helical in form. In the embodiment illustrated these elements are helical, substantially rigid, and have substantially the curvature of the brake shoes. Brake shoe 20 is preferably grooved as shown at 68, and the rod and tube extend into the groove. The tube terminates at the end of the brake shoe 20 in a flange 70 which engages the end of the shoe. The rod extends beyond the flange to a link 72 which has a rounded seat to receive the rounded end of the rod, like seat 64, and which in turn has a convex extremity within a rounded seat at the end of brake shoe 22.

In the operation of the invention, the pressure in chamber 34 above the diaphragm 38 is increased by the opening of a suitable valve (not shown) in the pipe 40, and the increased pressure moves the diaphragm away from the top of the casing, as shown in FIGURE 3, compressing the return spring 46. This movement is transmitted by the rod 44 and the link 56 to the rod 62 and is in turn transmitted to the end of brake shoe 22, causing the brake shoe to pivot outwardly about its anchor pin 30 and forcing the brake lining 26 against the drum 14. At the same time, since the chamber 34 is floatingly mounted and free to pivot at 58, the chamber moves in the opposite direction from the diaphragm, pulling the tube 66 with it. By virtue of the flange 70 on the tube, this force is exerted on the end of the brake shoe 20, causing the brake shoe to pivot outwardly about the anchor pin 30, and forcing the brake lining 24 against the brake drum 14. The actuating phenomenon is thus one of pressure action-reaction. When the pressure above the diaphragm is decreased, the diaphragm, casing, and brake shoes are returned to their rest positions under the influence of the springs 32 and 46.

It is thus apparent that the invention permits the mounting of the fluid chamber exteriorly of the brake drum and provides a simple, high efficiency, inherently protected linkage for connection of the actuator motor to the brake shoes. By virtue of the fact that the tube and rod have substantially constant curvature, the linkage operates freely. The extent of movement of the linkage and brake shoes is small, so that the eccentricity of the pivotal mounting of the pressure chamber is negligible. The pressure chamber could, of course, be mounted on a sleeve or the like for pivotal movement about the axis of the axle. Moreover, the actuating rod may be solid, or hollow like its surrounding tube.

While a preferred embodiment of the invention has been shown and described, it will be apparent to those skilled in the art that changes can be made without departing from the principles and spirit of the invention, the scope of which is defined in the appended claims. Within its broader aspects, the invention is not limited to brakes, but may be employed in other types of actuation. Also, a curved actuating linkage like that described could be employed for each brake shoe, with one of the curved members of each linkage performing the actuation and the other serving as a guide; such an arrangement would not require movable pressure chambers. Accordingly, the foregoing embodiment is to be considered illustrative, rather than restrictive of the invention, and those modifications which come within the meaning and range of equivalency of the claims are to be included therein.

The invention claimed is:

1. A vehicle braking mechanism comprising in combination a brake drum, curved brake shoes for said drum, means for actuating said brake shoes comprising a coaxial tube-and-rod linkage lying partly alongside and partly within one of said brake shoes, the rod of said tube-and-rod linkage being directly connected to said other brake shoe, the tube of said tube-and-rod linkage being arranged to operate said first-mentioned brake shoe, and fluid pressure means for supplying power to said brake actuator, said fluid pressure means comprising a plunger connected to the other end of said rod and a casing fixedly connected to said tube, said fluid pressure casing being pivotally connected to a fixed part of said vehicle, so that said casing may pivot in response to actions and reactions in the application of the brakes.

2. In a vehicle braking mechanism in which a brake drum is provided with a pair of internal curved brake shoes, the improvement which comprises a mechanical linkage for actuating the said brake shoes, said linkage comprising a curved, substantially rigid tube and a substantially rigid coaxial rod therein, said rod being connected to a free end of one brake shoe and said tube being connected to a free end of the other brake shoe, said linkage having a constant curvature and lying partly alongside and partly embedded within the body of, one of said brake shoes.

3. In a vehicle brake mechanism comprising a brake drum mounted at one end of a vehicle axle and a pair of arcuate brake shoes within said drum pivotally mounted on anchor pins, the improvement which comprises a fluid pressure chamber pivotally mounted relative to said axle and means interconnecting the said fluid pressure chamber with said brake shoes for actuating said brake shoes, said means comprising a curved linkage extending from said fluid pressure chamber to said brake shoes and following the curvature of said arcuate brake shoes, said pressure chamber being external to said brake drum and its associated brake shoes, said linkage comprising a pair of substantially rigid, relatively slidable, elongated elements of substantially constant curvature coupled to said brake shoes, respectively.

4. In a brake mechanism having a brake drum and a pair of pivotally mounted internal brake shoes concentric therewith, the improvement which comprises a curved brake shoe actuator having substantially constant curvature and consisting of a substantially rigid tube and a substantially rigid rod coaxial with said tube, a substantial portion of said actuator being located within said brake drum.

5. In a vehicle brake mechanism, a vehicle axle, a brake drum rotatably mounted on said axle and having internal brake shoes pivotally mounted therein, a fluid pressure casing pivotally mounted relative to said axle externally of said brake drum, and a mechanical linkage interconnecting said fluid pressure casing with said brake shoes, said linkage comprising a pair of substantially rigid, relatively slidable, elongated elements of substantially constant curvature coupled to said brake shoes, respectively.

6. A device according to claim 5 in which said mechanical linkage is in the form of a helix concentric with said axle.

7. A mechanical device as in claim 5 in which said mechanical linkage consists of an outer tube and an inner rod coaxial therewith.

8. A device according to claim 5 in which said mechanical linkage is in the form of a helix.

9. A mechanical device as in claim 8 in which said mechanical linkage consists of an outer tube and an inner rod coaxial therewith.

10. A braking mechanism or the like comprising in combination a brake drum, a brake shoe for said drum, means for actuating said brake shoe comprising substantially rigid, curved, elongated elements of substantially constant curvature, said means lying partly alongside and partly within the cavity of said brake drum and having one of said elements coupled to said brake shoe to actuate it, said elements being relatively slidable, and means external of the drum for causing said relative sliding movement.

11. The invention of claim 10, said elements being coaxial.

12. The invention of claim 10, said elements being helical.

13. The invention of claim 10, said last mentioned means comprising a fluid motor outside of said drum and having means for exerting a thrust on one of said elements.

14. A braking mechanism or the like comprising in combination a brake drum, a pair of brake shoes for said drum, means for actuating said brake shoes comprising substantially rigid, curved, elongated elements of substantially constant curvature, said means lying partly alongside and partly within the cavity of said brake drum, one of said elements being coupled to one of said brake shoes to actuate it and the other of said elements being coupled to the other of said brake shoes to actuate it, said elements being relatively slidable, and means external of the drum for causing said relative sliding movement.

15. A braking mechanism comprising in combination a brake drum, a pair of brake shoes for said drum, and a fluid motor for supplying power to actuate said brake shoes, said fluid motor comprising a casing having a plunger therein, said casing being coupled to one shoe for actuating it, and said plunger being coupled to the other of said shoes for actuating it, said casing being coupled to one of said shoes by a substantially rigid, curved, elongated element, and said plunger being coupled to the other of said shoes by a second substantially rigid, curved, elongated element substantially coaxial with said first element.

16. The invention of claim 15, said casing being pivotally mounted.

References Cited in the file of this patent

UNITED STATES PATENTS

| 1,961,798 | Sneed | June 5, 1934 |
| 1,984,883 | LaBrie | Dec. 18, 1934 |
| 2,016,875 | Sneed | Oct. 8, 1935 |
| 2,031,390 | Sneed | Feb. 18, 1936 |
| 2,040,202 | Cousins | May 12, 1936 |
| 2,162,775 | Dick | June 20, 1939 |
| 2,176,398 | Fowler | Oct. 17, 1939 |
| 2,777,542 | Russell | Jan. 15, 1957 |

FOREIGN PATENTS

| 962,408 | France | Dec. 12, 1949 |
| 779,793 | Great Britain | July 24, 1957 |
| 449,449 | Italy | June 18, 1949 |